Figure 1:
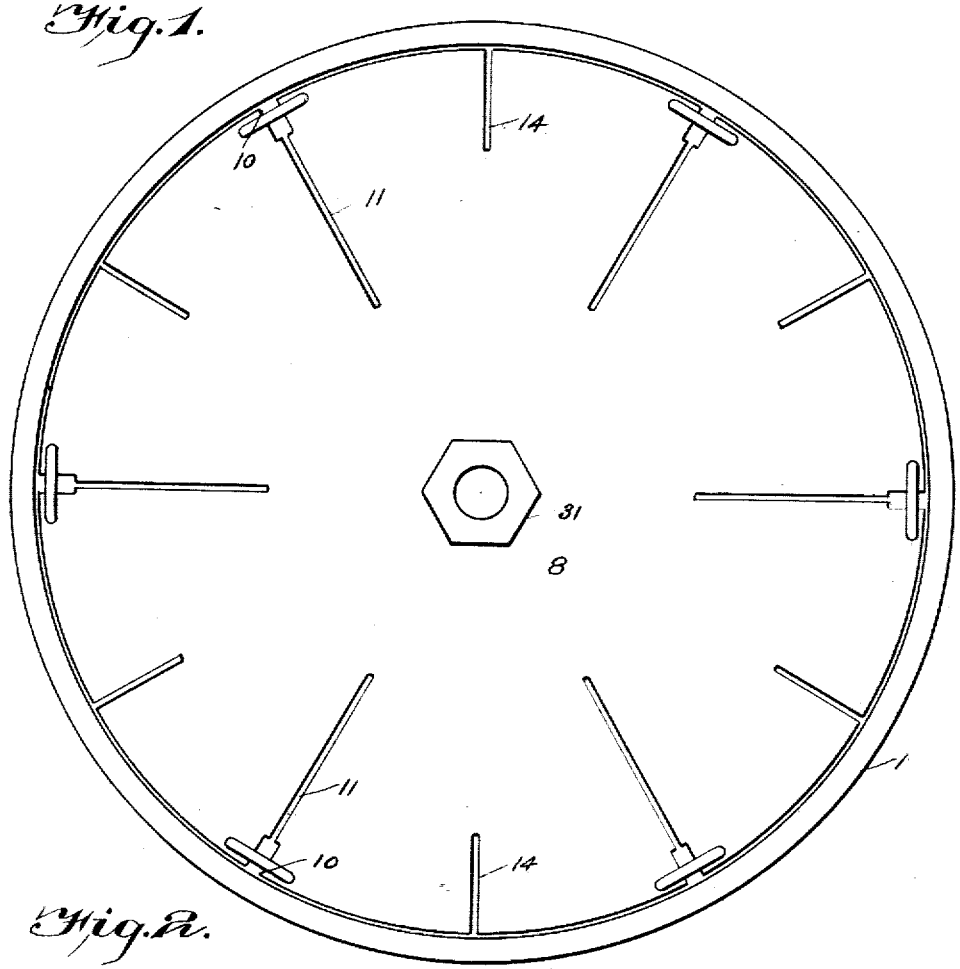

A. J. HODGE & H. B. RUGGLES.
BARREL HEAD AND SEAL.
APPLICATION FILED JULY 1, 1915.

1,265,657.

Patented May 7, 1918.
3 SHEETS—SHEET 1.

Inventor
A. J. Hodge
H. B. Ruggles

By Wm H Bates
Attorney

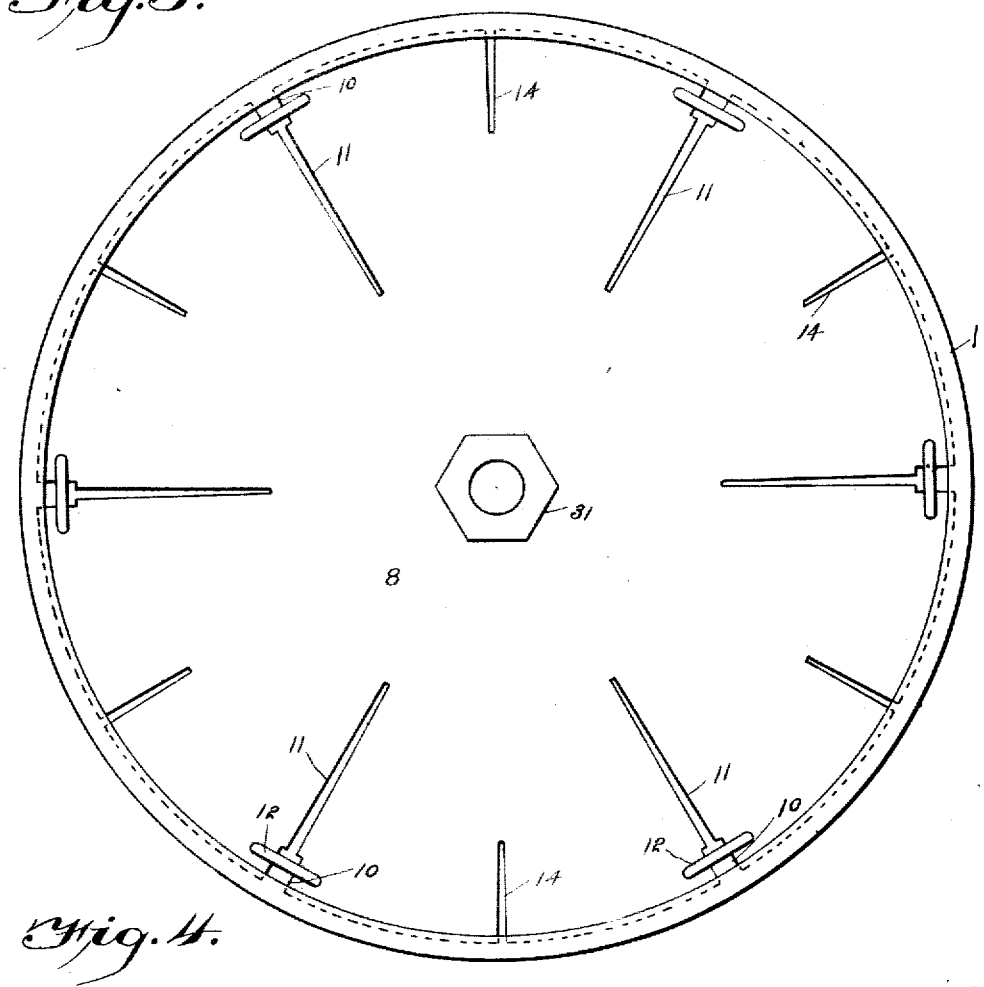
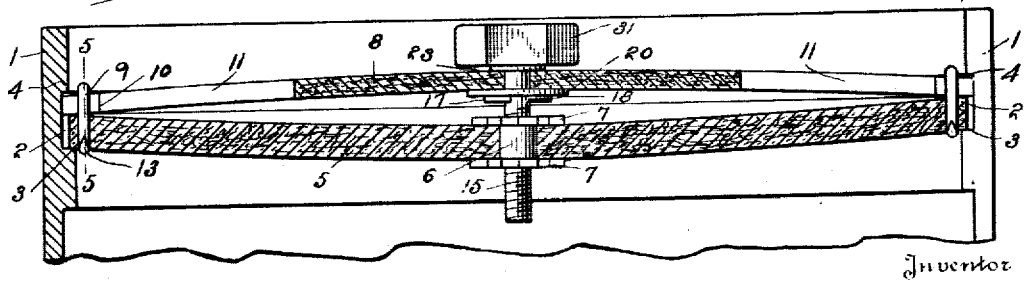
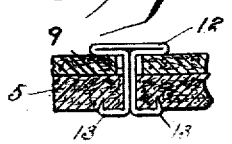

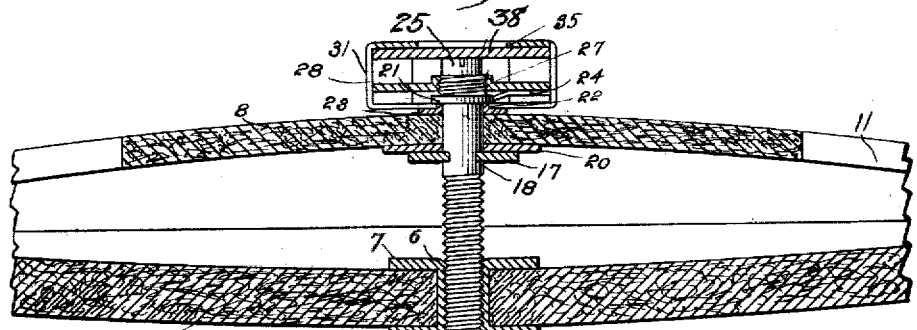
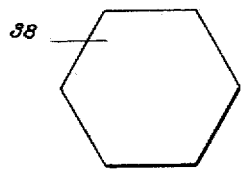
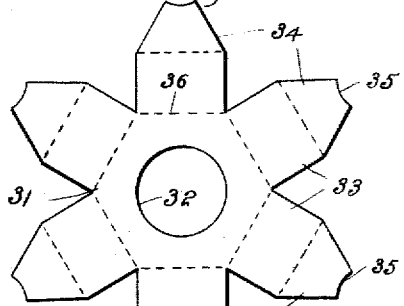
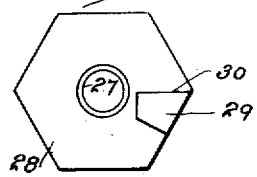
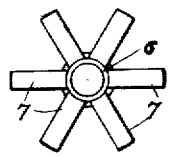
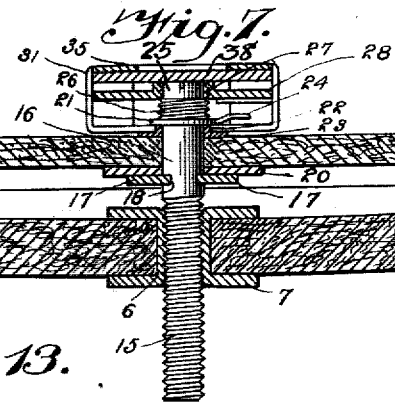
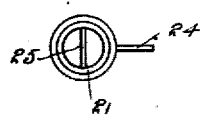

UNITED STATES PATENT OFFICE.

ARTHUR J. HODGE AND HENRY B. RUGGLES, OF PASADENA, CALIFORNIA, ASSIGNORS TO AMERICAN PRODUCTS COMPANY, OF ST. LOUIS, MISSOURI.

BARREL-HEAD AND SEAL.

1,265,657.　　　　　Specification of Letters Patent.　　Patented May 7, 1918.

Application filed July 1, 1915. Serial No. 37,577.

*To all whom it may concern:*

Be it known that we, ARTHUR J. HODGE and HENRY B. RUGGLES, citizens of the United States, residing at Pasadena, in the county of Los Angeles and State of California, have invented certain new and useful Improvements in Barrel-Heads and Seals, of which the following is a specification.

This invention has relation to certain new and useful improvements in barrel heads and seals, and has for its primary object, the provision of a barrel head fastener and seal which will be of such form that operation of a rotary member in one direction will cause an expansion and tightening of the head within a receptacle and seal the head in this position, so that operation of the rotary member in the reverse direction will have no effect whatever upon the head.

The invention has for another object the provision of a barrel head fastener and seal of this character in which the seal will be of such construction that the sealing and protecting disk must be punctured or removed after the head has once been sealed in position, before the head can again be loosened and removed.

The invention has for a further object, the provision of a head fastener and seal of this character which will be of such construction that the head may be readily placed in position in a barrel or other receptacle and the rotary cap of the seal operated to cause a radial and transverse expansion of one of the head members and thereby securely fasten and seal the head in position.

The invention has for a further object, the provision of a head of this character in which the expanding head member will be provided with inwardly directed slits through which extend the head member connecting turn pins carried by the opposite head member to retain the outer edges of the coöperating head members in their proper relative positions.

The invention has for a still further object, the provision of a barrel head fastener and seal of the above stated character, in which will be included novel locking means for locking the rotary member with the tightening screw for the head, to cause rotation of said screw with the rotary member when the latter is operated in one direction, and automatically release the rotary member from the head tightening screw upon operation of the rotary member in the reverse direction.

A still further object of the invention resides in the novel construction of the rotary member and closing the head of the tightening screw and the automatic locking and releasing mechanism, and also the sealing and protecting disk which prevents unauthorized parties from reaching and tampering with the tightening screw or the automatic locking and releasing mechanism without first puncturing or destroying the sealing and protecting disk and thereby leaving traces of their unlawful act.

With these and other objects in view, our invention consists in the novel construction, combination and arrangement of parts, as will be hereinafter more in detail described and the asserted novelty specifically pointed out in the claims.

In the accompanying drawings, which clearly and fully illustrate our invention:—

Figure 2:
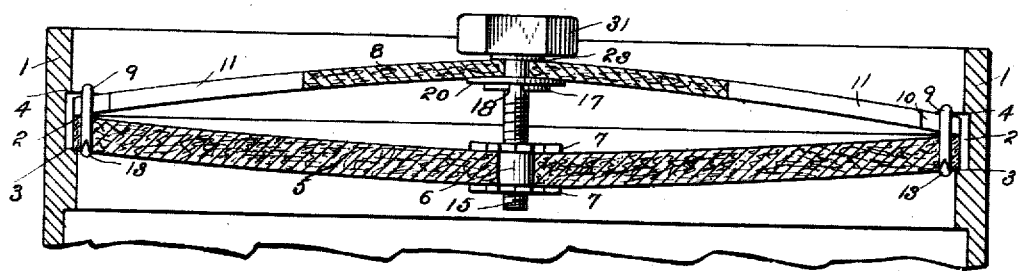

Figure 1 represents a top plan view of our improved barrel head and seal with the head loosely engaged in a barrel, Fig. 2 is a vertical transverse section through the same, Fig. 3 is a view similar to Fig. 1, with the head securely sealed in position, Fig. 4 is a vertical transverse section through the head, showing the same expanded and securely fastened in the barrel, Fig. 5 is a fragmentary detail section, substantially on the plane of line 5—5 of Fig. 4, Fig. 6 is an enlarged vertical transverse section through the central portion of the head and the seal, in normal position, Fig. 7 is a view similar to Fig. 6, showing the head and seal with the latter in operative position and the central portions of the head members drawn toward one another to expand the head, Fig. 8 is a plan view of the rotary outer seal member, showing the same in blank form, Fig. 9 is a plan view of the sealing and protecting disk.

Fig. 10 is a plan view of the screw straddling washer employed to prevent withdrawal of the head tightening and expanding screw, Fig. 11 is a bottom plan view of the screw rotating washer or nut, Fig. 12 is a plan view of the interiorly threaded central screw receiving socket, removed from the inner head member, and Fig. 13 is a top plan view of the head tightening and expanding screw, looking at the outer end of the same.

Referring more particularly to the drawings, in which similar reference characters designate corresponding parts throughout the several views, 1 designates the upper portion of a barrel or other cylindrical receptacle having a croze 2 formed therein with its lower wall or shoulder 3 extending slightly farther toward the center of the receptacle than the upper wall 4 of said croze, whereby the head may be readily placed in the receptacle with the edge of the lower head member 5 resting upon the lower wall or shoulder 3 of said croze 2, as will be readily understood by referring to Figs. 2 and 4 of the drawings.

The inner head member 5 is preferably formed of a fibrous pulp material and is of concavo-convex form with its convex face positioned downwardly when the head is in position within a receptacle, as clearly shown in the drawings. The inner head member 5 is also provided with an interiorly threaded central screw receiving socket 6 extended through the same and having radial tongues 7 bent over upon the upper and lower faces of said head section 5 to retain said interiorly threaded central socket in position.

The outer head member 8 is also preferably formed of a fibrous pulp material and is of concavo-convex form with its convex face positioned outwardly and its central portion spaced from the central portion of the inner head member 5, while its outer edge rests upon the outer edge of said inner head member 5 and is connected with the same by suitable connecting staples 9 carried by the inner head member 5 and having their parallel legs extending upwardly through the enlarged or widened outer ends 10 of the long radial slits 11 of the outer head member 8, after which the connecting staples 9 are given a quarter turn to bring their flattened heads 12 across the ends 10 of said slits 11 and upon the upper or outer face of the head member 8 to draw the edge of the same toward the edge of the inner head member 5. This will permit the outwardly and upwardly bent free extremities 13 of the legs of the connecting staples 9 to bite into the under face of the inner head member 5, as clearly shown in Figs. 2, 4 and 5, and thereby prevent the connecting staples 9 from accidentally turning in either direction and permitting the edges of the head members 5 and 8 to move away from one another.

By referring to the drawings, especially Figs. 1 and 3, it will be readily seen that the slits 11 extend inwardly from the edge of the outer head member 8 and toward the center of the same and short slits 14 are also provided between the slits 11 and extended inwardly for a short distance from the edge of said head member 8. It will also be evident that the slits 11 and 14 will permit ready radial and transverse expansion of the outer head member 8 as the central portion of said outer head member 8 is drawn toward the central portion of the inner head member 5 by the head tightening and expanding screw 15, which extends through the central opening 16 of the outer head member 8, as clearly shown in the drawings, the threaded portion of the screw being engaged through the interiorly threaded screw receiving socket 6, as clearly shown in Figs. 6 and 7 of the drawings.

The head tightening and expanding screw 15 is prevented from being withdrawn from the outer head member 8 by means of a screw straddling washer 17 driven upon the reduced portion 18 of said screw 15 provided by cutting away diametrically opposite portions of the screw and thereby providing opposite slots to receive the washer 17, as clearly shown in Figs. 2, 4, 6 and 7. It will be understood that the washer 17 is provided with a transverse recess 19 extending inwardly from one edge to a distance beyond the center of said washer 17, so that it may be readily driven upon the head tightening and expanding screw 15.

The screw straddling washer 17 is spaced from the outer head member 8 by a suitable spacing washer 20 loosely engaged around the head tightening and expanding screw 15, and while the washer 17 prevents withdrawal of the head tightening and expanding screw 15 from the outer head member 8, inward movement of the head tightening and expanding screw 15 through the outer head member 8, is limited by the annular flange 21 formed upon said head tightening and expanding screw 15 a short distance from the outer end thereof, and which annular flange 21 engages the upstanding edge 22 of the spacing washer 23 loosely engaged around said head tightening and expanding screw 15, outwardly of the outer head member 8 and serving to space said annular flange 21 from the latter.

Projecting radially from the annular flange 21 is a safety stop finger 24, the purpose of which will presently appear, and between the annular flange 21 and the outer slotted end or head end 25 of the head tightening and expanding screw 15, the latter is provided with a suitable number of spiral threads 26 to receive the interiorly threaded hub 27 of a locking nut 28 which is preferably of hexagonal form, as clearly shown in Fig. 11 and is provided upon its under face with a lug 29 which has a straight working edge 30 forming a shoulder extending transversely or radially of said locking nut 28 and adapted for contact or engagement with the safety stop finger 24 to limit rotation of the locking nut 28 in one direction upon the threads 26, thereby preventing injury to the threads 26 and the threads of the hub 27 and also eliminating danger of the locking nut 28 becoming too tight on the head of the screw 15 or becoming caught upon the threads 26 and thereby causing rotation of the head tightening and expanding screw 15 with the locking nut 28 as the latter is rotated toward the outer end of said head tightening and expanding screw 15. When the working edge 30 is engaged with or abuts against the safety stop finger 24, however, and the locking nut 28 rotated inwardly or in a clockwise direction, the locking nut 28 and head tightening and expanding screw 15 will be practically locked together for rotation in a clockwise direction, and this rotation of the head tightening and expanding screw 15 will draw together the central portions of the inner head member 5 and the outer head member 8 and thereby expand the head radially and transversely, as clearly shown in Figs. 4 and 7 of the drawings.

In Fig. 7 the locking nut 28 is shown as being returned to its outermost or normal position after the operation of tightening and expanding the head, while in Fig. 6, the locking nut 28 is shown in position for the beginning of the operation of tightening and expanding the head.

The outer end of the head tightening and expanding screw 15 which is the head end of the screw with the parts formed thereon and the locking nut 28 are inclosed and protected by the rotary outer seal member 31 (shown in blank form in Fig. 8), which consists of a flat central body portion having a central aperture 32 and has a plurality (preferably six in number), of radial arms 33 adapted to be bent downwardly at right angles against the sides of the locking nut 28, the free ends 34 of said radial arms 33 being tapered and adapted to be bent inwardly at right angles to the main portions of said radial arms and having their free edges recessed or concaved, as shown at 35, for engagement against the outer face of the upstanding portion 22 of the spacing washer 23 and beneath the annular flange 21 to prevent withdrawal or removal of the rotary outer seal member. It will be understood that when placing the rotary outer seal member 31 in position, the radial arms 33 are bent along the dotted lines 36 and 37, shown in Fig. 8, and the straight side edges of the main portions of said radial arms are brought into close relation with one another to close all space between said radial arms 33 and thereby prevent the insertion of a tool between said radial arms 33 for the purpose of tampering with the parts inclosed and surrounded by the same. It will also be understood that before the radial arms 33 are bent inwardly, a sealing and protecting disk 38, preferably solid and of hexagonal form, as clearly shown in Fig. 9 of the drawings, is placed in the rotary outer seal member 31 to cover the central aperture 32 thereof and cover the outer slotted end 25 of the head tightening and expanding screw 15 and thereby prevent an unauthorized party from engaging a screw driver or other tool with the head tightening and expanding screw 15 to rotate the latter in either direction.

As the main portions of the radial arms 33 engage the sides of the sealing and protecting disk 38 and also the locking nut or screw rotating nut, these two members will always rotate with the rotary outer seal member 31. Therefore, after the head has been placed in position within the receptacle, as shown in Figs. 1 and 2, it will simply be necessary to grasp the rotary outer seal member and rotate the same in a clockwise direction to cause the locking nut or screw rotating nut 28 to move downwardly or inwardly upon the threads 26 until the working edge 30 of the lug 29 contacts with or engages the safety stop finger 24 and catches the same, when a continued rotation of the rotary outer seal member 31 in this direction will also cause the head tightening and expanding screw 15 to rotate in the same direction and thereby tighten and expand the head by drawing together the central portions of the inner head member 5 and the outer head member 8, as previously described.

A counter-clockwise rotation of the rotary outer seal member 31 will, however, cause the locking nut or screw rotating nut to move outwardly upon the threads 26 to the position shown in Fig. 7, without having any effect whatever upon the head tightening and expanding screw 15, the lug 29 disengaging and moving away from contact with the safety stop finger 24 as said locking nut or screw rotating nut 28 moves outwardly.

It will therefore be seen that after the head has once been secured in position and expanded, it can only be tightened by rotation of the rotary outer seal member 31, but rotation of this member in a reverse direction will have no effect whatever upon the head or the head tightening and expanding screw 15 and the latter can not be reached without first removing this rotary outer seal member 31 or puncturing the sealing and protecting disk 38. This, therefore, makes it impossible for unauthorized parties to loosen or remove the head after it has once been expanded and secured in position without leaving evidence of their unlawful act.

While the preferred embodiments of the invention have been shown and illustrated, it will be understood that minor changes in the details of construction and arrangement of parts may be made within the scope of the appended claims without departing from the spirit of the invention or sacrificing any of the advantages of the same.

What is claimed is:—

1. A barrel head fastener and seal comprising a head tightening and expanding screw having a portion of its head end threaded, a screw operating member mounted upon said threaded portion, means for rotating said screw operating member and inclosing the same, and means for limiting free rotation of said member upon said head tightening and expanding screw in one direction and locking together said member and said screw.

2. A barrel head fastener and seal comprising a head tightening and expanding screw having a portion of its head threaded, a safety stop member projecting radially from said head, a screw operating member rotatably mounted upon said head and having a lug formed thereon for engagement with said safety stop member to lock together said screw and said screw operating member during rotation of the latter in one direction, a rotatable outer seal member inclosing the head of said screw and said screw operating member, said rotatable outer seal member being adapted to cause rotation of said screw operating member, and a sealing disk carried by said outer rotatable seal member to cover and protect the head of said screw.

3. A barrel head fastener and seal comprising a head tightening and expanding screw having a portion of its head threaded, a pin projecting radially from said head of said screw, a screw rotating member mounted upon the threaded portion of said head of the screw, a pin engaging lug carried by said member for engagement with said pin when said member is rotated in one direction to lock said member with said screw and compel the latter to rotate with said member to tighten and expand the barrel head through which said screw is engaged, a rotatable outer seal member for inclosing and rotating the first mentioned member, and a screw covering and protecting sealing disk within said rotatable outer seal member for covering and protecting the head of said screw.

4. The combination with inner and outer receptacle head members; of a head expanding and fastening screw carried by said outer receptacle head member and having threaded engagement with the inner receptacle head member, a screw rotating member threaded upon the head of said screw, means for locking together said screw and said screw rotating member upon rotation of the latter in one direction to cause said screw to draw the inner receptacle head member toward the outer receptacle head member and thereby expand and fasten said head members, an outer rotatable seal member surrounding the head of said screw and said screw rotating member and engaged with the sides of the latter to operate said screw rotating member, and a screw head covering and protecting sealing washer within said outer rotatable seal member.

5. The combination with a receptacle head; of a tightening and expanding screw, a screw rotating member mounted upon the same, means for locking said screw rotating member with said screw to rotate the latter upon rotation of said screw rotating member in one direction, an outer rotatable seal member inclosing said screw rotating member, said screw rotating member being adapted to rotate with said outer seal member, and means carried by said outer seal member for covering and protecting the head of said screw.

6. The combination with an inner head member, an outer radially slit head member, means for connecting said outer radially slit head member at its slit portions with the said inner head member, a head tightening and expanding screw carried by said outer radially slit head member, means for preventing withdrawal of said screw, said screw having threaded engagement with said inner head member, a screw rotating member mounted upon the head of said screw, means for locking together said screw rotating member and said screw for rotation in one direction, an outer seal member for inclosing and rotating said screw rotating member in either direction, and a sealing and screw head protecting disk carried by said outer seal member.

In testimony whereof we affix our signatures in the presence of two witnesses.

ARTHUR J. HODGE.
HENRY B. RUGGLES.

Witnesses:
R. H. PINNEY,
EDITH C. SALQUIST.